United States Patent

[11] 3,532,122

[72] Inventor Martin G. Bienzeisler,
Chippewa, Ontario, Canada
[21] Appl. No. 736,657
[22] Filed June 13, 1968
[45] Patented Oct. 6, 1970
[73] Assignee of one-half to
Theodore P. Szumla
Buffalo, New York

[54] SPOOL VALVE
8 Claims, 15 Drawing Figs.
[52] U.S. Cl. .................................................. 137/625.37;
251/367, 251/(O-ring)
[51] Int. Cl. ...................................................... F16k 3/24
[50] Field of Search ........................................ 251/(O-ring),
367; 137/625.37, 625.69

[56] References Cited
UNITED STATES PATENTS
3,126,915 3/1964 Hunt ............................ 251/(O-ring)

FOREIGN PATENTS
1,356,400 2/1964 France ..................... 251/(O-ring)
802,845 8/1955 Great Britain............ 251/(O-ring)

*Primary Examiner* — Arnold Rosenthal
*Attorney* — Sommer, Weber and Castel

ABSTRACT: A spool valve for high pressure fluid in which the forces distributed on the spool-mounted O-ring are such that excess wear and mutilation thereof are obviated comprising a housing, a bore in said housing, a sleeve insert in the bore, a high pressure fluid inlet and a fluid outlet in the housing, said insert containing a plurality of elongated slots separated by elongated members running axially of the bore, a manifold in the housing outside of said slots, a spool valve in the insert mounting an O-ring which moves lengthwise of the slots, and the slots and the O-ring being so dimensioned relative to each other so that the distribution of forces due to the high pressure fluid passing between said inlet and outlet cannot force the O-ring into the slots where mutilation can take place.

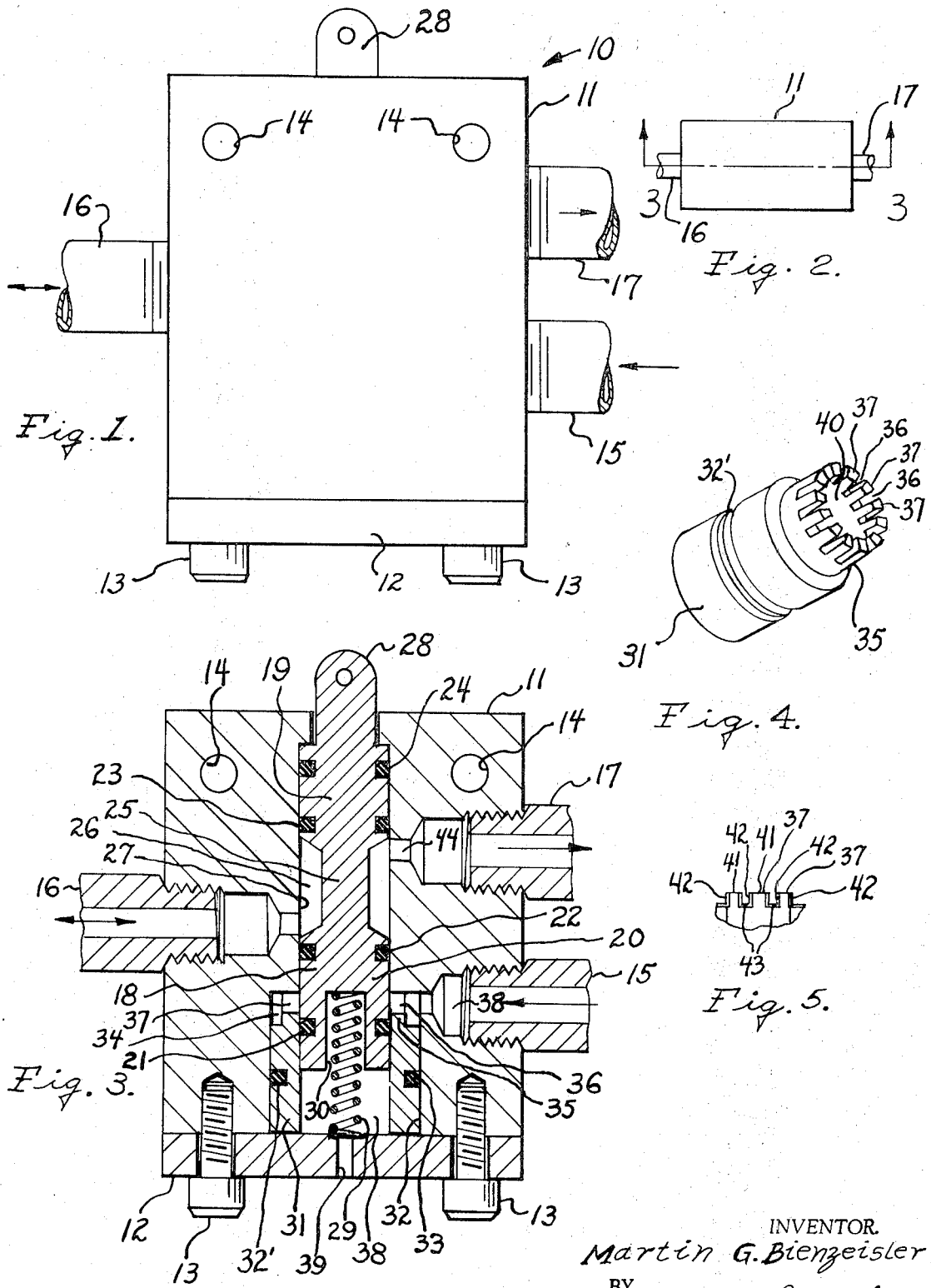

Patented Oct. 6, 1970

INVENTOR.
Martin G. Bienzeisler
BY
Joseph P. Gastel
ATTORNEY

＃ SPOOL VALVE

BACKGROUND OF THE INVENTION

The present invention relates to an improved O-ring type of spool valve which is used for high pressure fluids.

In the past, O-ring type of spool valves could not be used successfully for long periods of time for systems carrying high pressure fluids. The reason for this was because when the O-ring mounted on the spool moved past either the inlet or outlet port, the distribution of fluid forces was such that the O-ring was forced against the lip of the port with such force that it was chipped or otherwise mutilated. Thus, after relatively few cycles of operation, the O-ring was sufficiently marred to permit leakage. It is with the overcoming of the foregoing shortcoming in an extremely simple and expedient manner that the present invention is concerned.

SUMMARY OF THE INVENTION

It is accordingly the primary object of the present invention to provide an improved O-ring type of spool valve for high pressure fluid which can function efficiently for prolonged periods of time without replacement of the O-ring because the distribution of forces to which the O-ring is subjected does not cause it to be chipped, scored or otherwise mutilated in operation.

Another object of the present invention is to provide an improved O-ring type of spool valve for high pressure fluid systems in which the force required to open and close the valve is relatively small because the O-ring does not in any way act as a wedge which impedes movement of the spool.

A further object of the present invention is to provide an improved high pressure spool valve which can be fabricated at a relatively low cost. A related object of the present invention is to provide an improved spool valve construction of the foregoing type which is highly simplified in construction in that it contains relatively few parts which can be fabricated in a relatively simple manner.

Still another object of the present invention is to provide an improved spool valve which can be used for metering a high pressure fluid therethrough in an extremely simple and efficient manner. Other objects and attendant advantages of the present invention will readily be perceived hereafter.

The improved high pressure spool valve of the present invention includes an housing having an inlet and an outlet with a bore in the housing and a sleeve insert within the bore, the insert being of generally cylindrical form and having a plurality of elongated slots therein for effecting communication between said inlet and outlet through the inside of the insert. A spool is mounted for rectilinear movement within the insert and mounts an O-ring which is moved across the slots, which are separated by elongated finger-like portions of the insert. The slots may be located proximate the inlet or outlet. The outer surface of the insert may be cut away or there may be an undercut portion within the housing which acts as a manifold for directing the fluid through the slots in approximately a 360° zone. The width of the slots is proportioned relative to the size of the O-ring so that the O-ring cannot enter the slots and thus in passing the ends of the slots will not be forced outwardly against the edges of the insert adjacent the slots which could score, chip or otherwise mutilate the O-ring. Since this damaging of the O-ring is thus avoided, the improved spool valve can function practically indefinitely without requiring replacement of the O-ring. Furthermore, since the distribution of fluid forces on the O-ring is such that it is not forced against the ends of the slots as it moves between opened and closed positions, the force required to actuate the spool valve is relatively low. The sleeve insert containing the elongated slots and the elongated fingers therebetween can be machined and deburred to remove the sharp edges when it is outside of the housing, this procedure enhancing the ease of fabrication. With the construction of the present invention thousands and thousands of cycles of valve operation were obtainable under pressure in excess of 2,000 pounds per square inch without in any way damaging the O-ring beyond its usefulness. The present invention will be more fully understood when the following portions of the specification are read in conjunction with the accompanying drawings wherein:

BRIEF DESCRIPTION OF THE DRAWINGS

FIG. 1 is a side elevational view of the improved valve of the present invention;

FIG. 2 is a reduced plan view of the valve of FIG. 1;

FIG. 3 is a view partially in cross section taken substantially along line 3–3 of FIG. 2;

FIG. 4 is a perspective view of the sleeve insert for the spool valve;

FIG. 5 is a fragmentary view showing the manner in which the spool valve is relieved or deburred in the vicinity of the slots on its inner surface;

DESCRIPTION OF THE PREFERRED EMBODIMENTS

Figure 6:
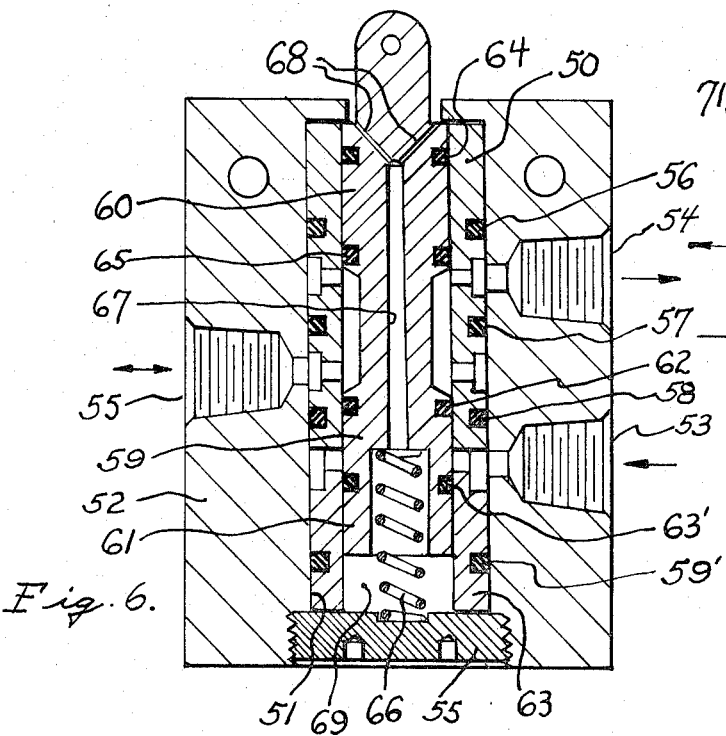
FIG. 6 is a view partially in cross section of a modified type of spool valve which incorporates the principles of the present invention.

One embodiment of the present invention is shown in FIGS. 1 through 5. Valve 10 includes an housing 11 having a cap 12 mounted at the end thereof by screws 13 which extend through suitable apertures in the cap and are threaded into the housing. A plurality of apertures 14 extends through the housing for receiving anchoring members which mount the valve on any desired object. A high pressure inlet conduit 15 has its end threaded into housing 11. A conduit 16 is also threaded into housing 11 for conducting the high pressure fluid to an external device when conduits 15 and 16 are in communication. In addition, a conduit 17 also has its end threaded into housing 11 and is in communication with conduit 16 when the device at the end of conduit 16 is to be exhausted. The valve 10 is set up so that either conduits 15 and 16 are in communication or conduits 16 and 17 are in communication. Conduits 15 and 17 cannot be in communication with each other.

The communication between the various pressure conduits 15, 16 and 17 is effected by a spool 18. Spool 18 includes two spaced cylindrical lands 19 and 20, with land 20 mounting upper O-ring 22 and lower O-ring 21. Upper land 19 mounts lower O-ring 23 and upper O-ring 24. Lands 19 and 20 are connected by reduced neck portion 25 to provide an annular space 26 within bore 27 for permitting the fluid to pass between the various conduits, depending on the position in which the spool 18 is located. In the position shown in FIG. 3 it can be seen that O-rings 21 and 22 prevent high pressure fluid in conduit 15 from passing therefrom. A tab 28 is located at the end of spool 18 for attachment to a motor source for moving the spool within bore 27 downwardly against the bias of spring 29 which is interposed between plate 12 and spool 18, with the upper portion of spring 29 being received in recess 30 of the spool.

It can readily be seen that when spool 18 moves downwardly a point will be reached where O-ring 22 must effectively pass by the outlet of conduit 15 to permit communication between conduits 15 and 16 through the annular space 26. In the past, as noted briefly above, and as explained in greater detail hereafter, O-ring 22 was subjected to certain forces resulting from the high pressure in conduit 15 so as to cause it to be chipped, shaved, or otherwise mutilated after relatively few cycles of use and therefore its efficiency as a sealing member was destroyed.

In order to overcome mutilation of the O-ring, a sleeve insert 31 is mounted within bore 32 of housing 11. Insert 31 is of general cylindrical annular shape and includes a groove 32' (FIG. 4) therein which mounts a sealing O-ring 33. The insert 31 is located within bore 32 with a relatively tight fit and the O-ring 33 prevents any leakage therebetween. The insert 31 is held in position by plate 12. Bore 32 is of greater diameter than bore 27. The inner diameter of insert 31 is the same as the diameter of bore 27. The upper end of insert 31 is reduced at 35 to provide an annular space between the wall of bore 32 and the outer surface of insert 31 in this area. In other words, reduced end portion 35, in combination with bore 32, produce an annular manifold at 34. Reduced end portion 35 contains a plurality of elongated equidistantly spaced slots 36 extending around its entire periphery, said slots being separated by elongated finger-like members 37. It can thus be seen that there can be communication between bore 27 and high pressure inlet conduit 15 through the bore 38 at the end of inlet conduit 15, annular inlet manifold 34 and elongated slots 36. It will readily be appreciated relative to FIG. 3 that there can be an annular undercut surrounding fingers 37, in housing 11, if desired, and in this event the end of the sleeve insert 31 does not have to be reduced at 35 but can be perfectly cylindrical throughout its length. In this modification it is the undercut in the housing which serves as a manifold, rather than the reduced portion 35 in combination with bore 32.

It will be appreciated that when the spool 18 is in a position shown in FIG. 3 lower O-ring 21 prevents leakage from the valve to the atmosphere through chamber 38 and vent 39. Furthermore, O-ring 22 which is located above insert 31 prevents communication between conduit 15 and annular space 26. In order to effect communication between conduits 15 and 16, spool 18 must be moved downwardly so that O-ring 22 moves across slots 36. At this point it is to be noted that the edges of elongated members or fingers 37 on the inside surface 40 of insert 18 are relieved or deburred along opposite sides 42, as can be seen from FIG. 5, so as to eliminate any sharp edges which could cut O-ring 22. Furthermore, the bottom edges of the slots 36 are relieved at 43. The relieving process is effected manually by means of a cutting or deburring tool which is rubbed lightly against the edges to deburr them. The relieved portions have been exaggerated in the drawings for the sake of illustration, but for all practical purposes the broken edges are barely visible to the eye, and constitute a very small chamfer. As noted above, it is merely a matter of deburring. Upper edges 41 of the fingers 37 are not deburred so that the fingers merge smoothly into bore 27 inasmuch as any chamfer would produce a groove where fingers 37 join bore 27. At this point it is to be noted that the machining and deburring of sleeve insert 31 is performed externally of housing 11. Therefore the inside surfaces which are to be deburred are easily accessible to the manual cutting tool which is used for deburring. This procedure obviates the necessity for complex and costly machining procedures. After spool 18 has been moved to the position where it permits communication between conduits 15 and 16, O-ring 23 on upper land 19 will be below conduit 44 at the end of outlet conduit 17 so as to block off this exhaust port.

Because of the relative dimensioning between O-ring 22 and slots 36, in addition to the foregoing structure, namely the deburred edges, O-ring 22 cannot be cut, chipped, shaved, or otherwise mutilated in such a manner which will injure it. More specifically, O-ring 22 is of a sufficiently large diameter and slots 36 are of a sufficiently small width so that the O-ring cannot enter the slots and therefore cannot be cut by the edges 42 of the fingers 37 and especially ends 43 (FIG. 5) as the O-ring 21 traverses these edges. This multilation is eliminated both when O-ring 22 moves downwardly and when it moves upwardly.

Figure 13:
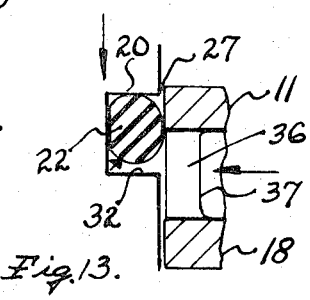
FIGS. 13, 14 and 15 show the sequence of an O-ring mounted in a spool valve of the present invention passing the high inlet pressure port of the valve in such a manner as not to be deformed, chipped or otherwise worn away.
Figure 14:
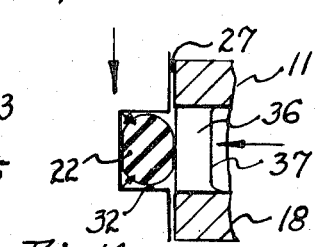
Figure 15:
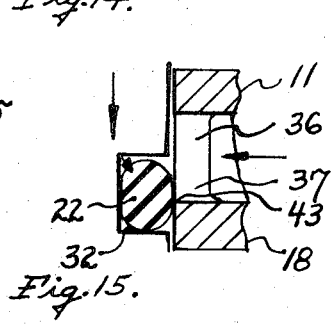

The actual action which occurs when O-ring 22 passes slots 36 can best be seen from FIGS. 13, 14 and 15 wherein the numerals correspond in all respects to the numerals of FIGS. 1 to 4. As O-ring 22 is first exposed to the high pressure entering through slots 36, this high pressure will enter spool valve groove 32 to exert a force in the direction of the arrows on O-ring 22, especially considering that the space 27 between land 20 and housing 11 is a low pressure area. There is initially a force exerted on O-ring 22 which tends to force the O-ring radially outwardly from groove 32. However, fingers 37 hold the O-ring within groove 32 by preventing it from popping outwardly, and as noted above, the slots 36 are dimensioned in such a manner relative to the diameter of the O-ring so that it cannot flex and enter these grooves.

Figure 10:
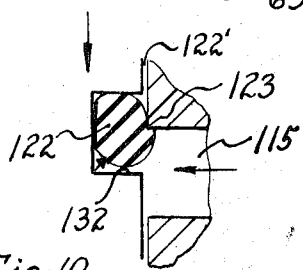
FIGS. 10, 11 and 12 show the deformation of the O-ring in a conventional valve as it passes the high pressure inlet of the valve, which results in its being worn out prematurely.

In contrast to what happens with applicant's construction, it can be seen what happens to a conventional O-ring 122 in a conventional valve structure in FIG. 10 wherein fingers 37 and slots 36 are not provided. In this conventional structure the high pressure from the inlet 115 will enter the O-ring groove 132 and cause the O-ring 122 to assume the shape shown wherein the corner 123 of the housing digs into the O-ring. This occurs because the high pressure fluid from conduit 115 enters groove 132 and causes the pressure to be distributed as shown by the arrow within the groove, especially considering that area 122' is a low pressure area. This deformation of O-ring 122 will become scored because the sharp edge 123 bites into it.

Figure 11:
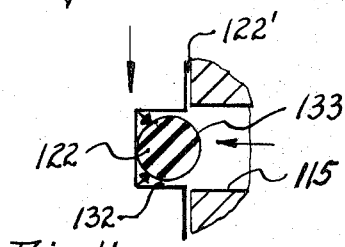

In the construction of the present invention, continued movement of O-ring 22 to an intermediate position on fingers 37 is shown in FIG. 14. In this figure the distribution of pressure forces on the O-ring are substantially equalized because the forces behind the O-ring within groove 32 are balanced by the forces exerted on the O-ring by the fluid in conduit 115. In other words, the situation which occurs in FIG. 10 is no longer present namely, there is no longer the exertion of an unequal distribution of high pressure fluid on the O-ring causing it to be deformed. The analogous position that a conventional valve occupies is shown in FIG. 11 wherein O-ring 122 in groove 132 is shown with its side 133 extending into high pressure inlet groove 115. Summarizing, O-ring 122 does not extend into the high pressure inlet conduit because of fingers 37, whereas the O-ring 122 in the conventional construction does.

Figure 12:
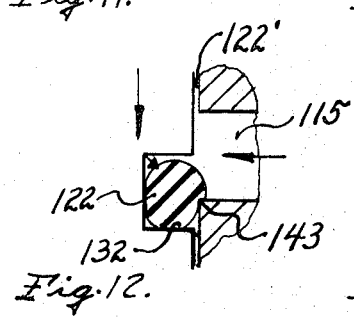

The last and most serious stage wherein scoring, shaving, chipping and mutilation is encountered in a conventional construction is shown in a comparison of FIGS. 15 and 12. In the improved valve of the present invention the O-ring 22 has been kept out of slots 36 by fingers 37. When it reaches the bottoms 43 of slots 36, the pressure distribution is shown by the arrows and this tends to drive O-ring 22 against edges 43. However, since the fingers 37 have held O-ring 22 out of slots 36, the O-ring passes right over edges 43 without being chipped or shaved. This can be appreciated more fully when FIG. 15 is compared with FIG. 12 wherein the analogous O-ring 122 in a conventional valve construction is deformed to the condition shown by the distribution of pressure forces. More specifically, the high pressure from inlet 115 is in the O-ring groove 132 tending to force O-ring 122 radially outwardly. Therefore, O-ring 122 is deformed to the condition shown. The distribution of forces forcing the O-ring 122 to the distorted condition shown in FIG. 12 causes this O-ring to be forced against the corner 143 of the inlet conduit and as it is moved past this corner, this corner digs out or scores or chips the O-ring. Repeated movement of the O-ring across this edge will result in its ultimate mutilation to the extent that it becomes incapable of sealing. In addition, the distortion of the O-ring impedes movement of the spool in the conventional construction because of a wedging action in FIGS. 10 and 12, but in the present invention this impeding action is not experienced.

Reversing the steps shown in FIGS. 10, 11 and 12 shows how the O-ring 122 is scored or mutilation which is experienced with a conventional valve structure as shown in FIGS. 10 through 12 is eliminated entirely by the construction of the present invention, as described above relative to FIGS. 13, 14 and 15. Because this multilation is obviated, the life of the O-ring is prolonged and the valve becomes serviceable for practically an infinite number of cycles.

In FIGS. 6 another embodiment of the present invention is shown. This embodiment differs from that described above relative to FIGS. 1 through 4 in that two inserts 50 and 63, preferably of steel, are inserted into bore 51 of valve housing 52 having a high pressure inlet 53 and an exhaust 54 and an outlet 55 leading to a device to be controlled. The inserts 50 and 63 are held in position within housing 52 by screw disc 55 which is threaded into the housing. O-rings 56, 57, 58 and 59' provide sealing between inserts 50 and 63 and the housing. A spool 59 is mounted for sliding movement in inserts 50 and 63 and contains spaced lands 60 and 61. O-rings 62 and 63' are mounted on land 59 and O-rings 64 and 65 are mounted on land 60.

Insert 63 is analogous in all respects to insert 31 of FIG. 3. Therefore, the slots and the fingers at the end of this insert will not be described in detail. It is only pertinent to note that it is O-ring 62 which traverses the slots and the fingers. The difference between the embodiment in FIG. 6 and that shown in FIG. 3 is that two inserts 50 and 63 are placed in a bore of uniform diameter, rather than having a single insert, such as 31, placed in the enlarged portion of a bore. In order to permit spool 60 to move up and down against or with the bias of spring 66, a conduit 67 is provided in the spool leading to conduits 68 which thus vent chamber 69 to the atmosphere.

Figure 7:
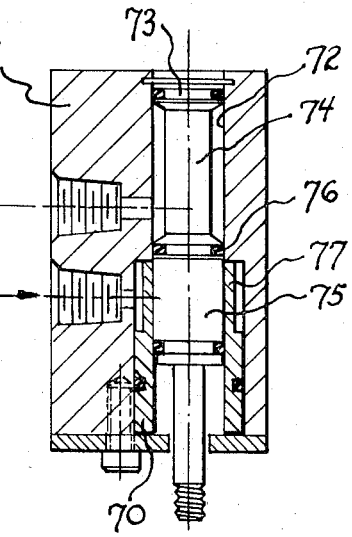
FIG. 7 is a view partially in cross section of a metering type of spool valve which embodies the principles of the present invention.

In FIG. 7 a still further embodiment of the present invention is shown. Insofar as pertinent here, this embodiment is for the purpose of providing a metered flow of high pressure fluid. To this end an insert 70 is provided, which is analogous in all respects to insert 31 of FIG. 3. This insert has the elongated slots and the fingers at the end thereof. Also within the housing 71 is a bore 72 which receives the upper land 73 of spool 74, the lower land 75 being received mostly in insert 70. O-ring 76 on land 75 traverses fingers 77 of insert 70. It is to be especially noted that fingers 77 are extremely long and the slots bordered by fingers 77 are extremely long also. Therefore, as O-ring 76 moves downwardly in bore 72, it will progressively uncover more of the slots between fingers 77 and in this manner a controlled flow can be obtained. For example, if O-ring 76 is half-way down fingers 77, there will be half of the flow which is possible and if it is down to the bottom of the fingers then a full flow is obtained. Any proportionate flow can also be obtained depending on the position of O-ring 76 relative to fingers 77. At this point it is to be noted that by varying the dimensions of the slots between fingers 77 and between fingers 37 (FIG. 3) different rates of flow can be obtained with different inserts. In other words, a standard housing can receive differently dimensioned inserts, as required for any particular purpose.

Figure 8:
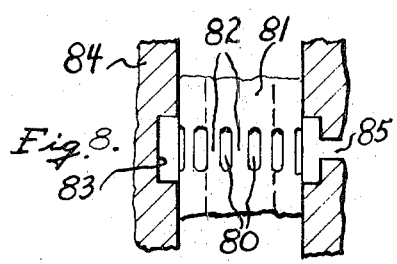
FIG. 8 is a fragmentary view in cross section showing another manner in which the slots may be made in the insert.
Figure 9:
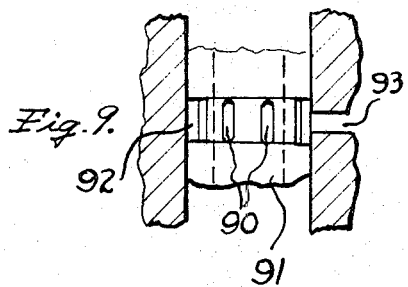
FIG. 9 is a view partially in cross section showing an embodiment which differs from FIG. 8 but is directed to the same general subject matter.

In FIGS. 8 and 9 alternate embodiments of the present invention are shown. In FIG. 8 elongated slots 80 are end milled into sleeve or insert 81 and fingers 82 are thus formed between slots 80. It is to be noted that an annular undercut 83 is provided in valve housing 84 and it is this undercut which acts as a manifold to conduct high pressure fluid into slots 80 from high pressure inlet 85. This embodiment differs from the preceding embodiment in that slots 80 are spaced from the end of sleeve 81 rather than being located at the end thereof, as in FIGS. 3 and 6. In FIG. 9 another embodiment is shown wherein slots 90 are milled into sleeve 91 and an annular groove 92 is formed on the outside of sleeve 91 to act as a manifold to receive high pressure fluid from inlet 93 and distribute it to the elongated holes 90.

In the preceding description, especially relative to FIGS. 1 through 5, conduit 15 was designated as the high pressure inlet conduit and conduit 16 the outlet conduit. The description of mode of operation as set forth relative to FIGS. 13 through 15 was for a valve having this kind of porting. However, it is to be understood that a similar type of action occurs on the O-ring in the event conduit 16 is the high pressure inlet conduit and conduit 15 is the outlet. In other words, whenever an O-ring passes a conduit across which there is a differential of pressure, namely, high pressure on the upstream side and low pressure on the downstream side, there will be a tendency for the distribution of pressure forces within the O-ring groove to tend to pop the O-ring radially outwardly from the groove whether the O-ring is passing the high pressure inlet port or the outlet port, and the following claims are intended to cover both of these situations notwithstanding that emphasis in the preceding description has been placed primarily on a construction where the O-ring passes the high pressure port.

A specific valve according to the present invention was made up with the following dimensions:

Size of O-ring 22—.500" outside diameter and .070" thick.
Diameter of slot 32 for O-ring 22—.374".
Width of slot 32—.085".
Diameter of bore 27 and inside diameter of insert 31—.500".
Slots 36—.032" wide x .120" long—18 slots.
Outer diameter of spool land 20—.499".

I claim:

1. A spool valve for high pressure fluid comprising a housing, a first bore in said housing, a high pressure fluid inlet conduit in said housing, an outlet conduit in said housing, an insert in said first bore having an outer surface on the outside of said insert and having an inner surface on the inside of said insert defining a second bore, a plurality of elongated slots in said insert extending between said outer and inner surfaces and extending axially of said second bore for effecting communication between said inlet and outlet conduits through said second bore, a spool mounted for axial movement in said second bore, a groove in said spool, an O-ring in said groove, and a plurality of elongated members positioned between adjacent pairs of said elongated slots to maintain said O-ring in said groove while said spool moves said O-ring past said grooves to thereby confine all parts of said O-ring against outward displacement from said groove due to the forces produced by said high pressure fluid passing through said second bore, said first bore being of a first diameter, a third bore in said housing forming an extension of said first bore and being of a second diameter which is less than said first diameter but which is of substantially the same diameter as said second bore, and wherein said slots are formed at the end of said insert and said insert is located within said first bore so that the end of said insert coincides with the end of said first bore and so that second and third bores essentially form a continuous bore for housing said spool.

2. A spool valve as set forth in claim 1 wherein said outer surface of said insert proximate said slots is effectively reduced to provide a manifold for said slots.

3. A spool valve as set forth in claim 1 wherein said inner surface of said insert forms a smooth continuation on to said elongate members and wherein the edges of said elongate members proximate said inner surface and the ends of said slots on the inside of said insert are relieved to obviate any sharp edges which could mutilate portions of said O-ring traversing said slots.

4. A spool valve as set forth in claim 3 wherein said outer surface of said insert proximate said slots is effectively reduced to provide a manifold for said slots.

5. A spool valve as set forth in claim 4 wherein said spool includes a reduced portion for permitting communication between said inlet conduit and said outlet conduit on movement of said spool to a position wherein said O-ring does not block communication between said inlet and outlet conduits.

6. A spool valve for high pressure fluid comprising a housing, a first bore in said housing, a high pressure fluid inlet conduit in said housing, an outlet conduit in said housing, an insert in said first bore having an outer surface on the outside of said insert and having an inner surface on the inside of said insert defining a second bore, a plurality of elongated slots in said insert extending between said outer and inner surfaces and extending axially of said second bore for effecting communication between said inlet and outlet conduits through said second bore, a spool mounted for axial movement in said second bore, a groove in said spool, an O-ring in said groove, and a plurality of elongated members positioned between adjacent pairs of said elongated slots to maintain said O-ring in said groove while said spool moves said O-ring past said grooves to thereby confine all parts of said O-ring against outward displacement from said groove due to the forces produced by said high pressure fluid passing through said second bore, said insert comprising a first tubular member and a second tubular member, said first tubular member containing said elongated slots and said elongated members at the end thereof being in abutting engagement with said second tubular member.

7. A spool valve as set forth in claim 6 wherein said inner surface of said second tubular member forms a smooth continuation on to said elongate members and wherein the edges of said elongate members proximate said inner surface and the ends of said slots on the inside of said insert are relieved to obviate any sharp edges which could score portions of said O-ring traversing said slots.

A spool valve as set forth in claim 7 wherein said outer surface of said insert proximate said slots is effectively reduced to provide a manifold for said slots.